Oct. 6, 1931.  V. G. APPLE  1,826,295

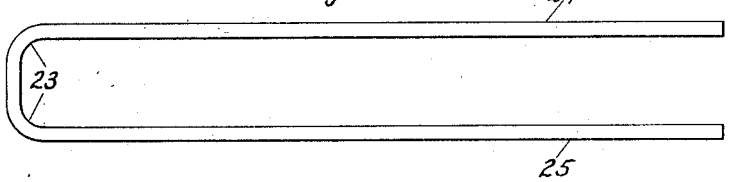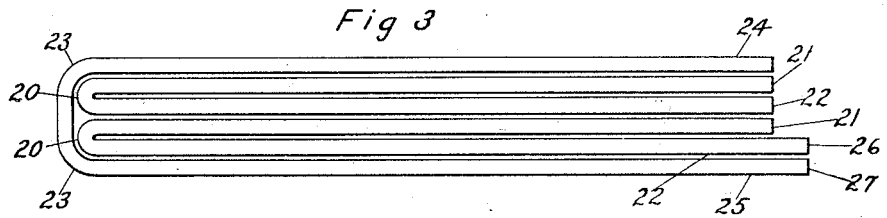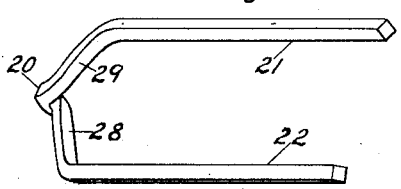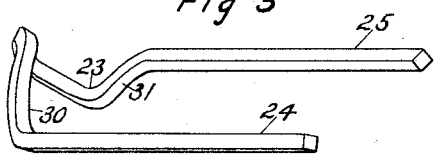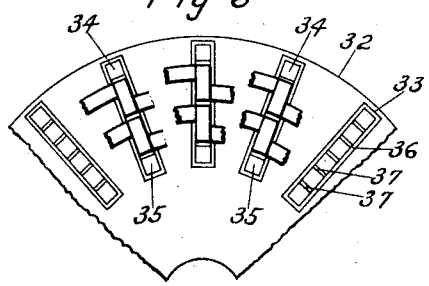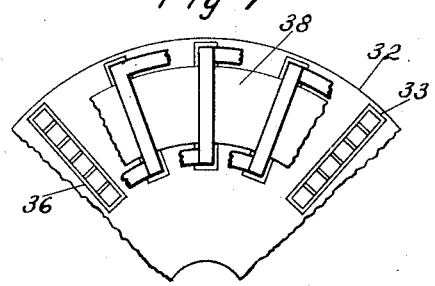

DYNAMO ELECTRIC MACHINE ELEMENT

Filed June 14, 1928  2 Sheets-Sheet 2

INVENTOR.
Vincent G. Apple

Patented Oct. 6, 1931

1,826,295

UNITED STATES PATENT OFFICE

VINCENT G. APPLE, OF DAYTON, OHIO

DYNAMO ELECTRIC MACHINE ELEMENT

Application filed June 14, 1928. Serial No. 285,359.

The invention relates to that type of dynamo electric machine element known as bar wound and more particularly so when the element includes as part of its structure a plural turn rather than a single turn bar winding.

One of the objects of the invention is to provide a bar winding of more than two layers so that the completed winding may consist of a relatively larger number of turns than when a two layer bar winding is used.

Another object of the invention is to provide a plural turn winding adjustable to cores having closed or semi-closed slots, the loops comprising the winding being so formed that they may be endwise entered therethrough.

Other objects of the invention will become apparent to those skilled in the art as the invention is described in detail and reference is made to the drawings wherein—

Figs. 1 and 2 show forms of loops used in my improved winding.

Fig. 3 shows two loops Fig. 1 and one loop Fig. 2 assembled.

Figs. 4 and 5 show loops Fig. 1 and Fig. 2 respectively after spreading the conductor bars sufficiently to compose a turn of the winding.

Fig. 6 is part of an end view of a core showing four layers composed of loops Fig. 4 assembled therein.

Fig. 7 shows the same partial end view after loops Fig. 5 have been added thereto.

Figure 8:
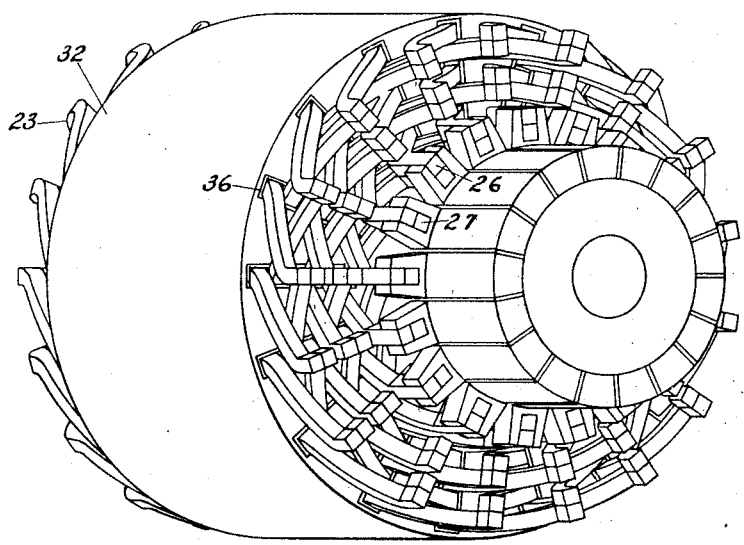
Fig. 8 shows how the free ends are bent, half oppositely to the other half, the two inner layers connecting to commutator bars, and the other layers being properly paired and joined.

In putting my invention into practical form I prefer to use square or rectangular bars or wire for the conductors altho round or other forms of conductors may be used. A length of wire sufficient for one turn of the winding is preferably folded, as at 20, causing two conductors, 21 and 22, to extend parallel and relatively close together, as in Fig. 1. A somewhat longer length of wire is next preferably bent, as at 23, in such a manner that the two conductors 24 and 25 extend parallel, but considerably spaced apart, as in Fig. 2.

A single turn bar winding is usually made up entirely of conductors of the form shown in Fig. 1 and the conductors 22 being closer to the armature axis than the conductors 21, the entire winding consists of and is arranged in two concentric layers. In the plural turn winding herein disclosed the number of layers are increased to correspondingly increase the number of turns. For illustrative purposes only I have arbitrarily selected a three-turn bar winding to disclose my method of procedure and to carry this into effect I preferably bend the wire as at 23, Fig. 2, so that the conductors 24 and 25 are spaced apart sufficiently to enclose two of the bars shown in Fig. 1. The bar Fig. 2 and the two bars Fig. 1 are assembled in Fig. 3 to show the relative positions that the conductors assume in the six layers of this three-turn winding. A two-turn winding may preferably consist of one bar Fig. 1 surrounded by one bar Fig. 2, while a four-turn winding may consist of three bars Fig. 1 surrounded by one bar Fig. 2.

The conductors comprising the two inner layers have been prolonged, as at 26 and 27, to facilitate connection to a commutator, tho other suitable points may be used instead for such connection when desired.

Before the bars Figs. 1 and 2 are entered into a core the conductors are spread as in Figs. 4 and 5 respectively to form loops, the conductors 21, 22, 24 and 25 being circumferentially spread apart sufficiently to compose turns of the winding and the portions 28, 29, 30 and 31 which connect the spaced apart conductors may be of the contour shown, or they may be of any other form which will connect the spaced apart conductors of a loop without interference, one connecting portion with another. The conductors of a loop, after being thus spaced apart, should occupy positions in the same layer as they occupied prior to spreading.

In Fig. 6 I show part of an end view of a core 32 having closed slots 33, 33 etc., and assembled therewith several loops, Fig. 4, a portion of the loops being broken away for clearness. Spaces 34, 34 etc. and 35, 35 etc. are left open into which the conductors of loops Fig. 5 may be later assembled. As the loops are necessarily insulated from the core slots and from each other some form of insulation must be provided. This may consist of a layer of insulating material entirely covering the loops except at their open ends where they are to be joined or it may consist of linings of insulating material in the core slots, as at 36—36 etc. with partitions 37—37 etc. extending between the conductors. If the surfaces of the loops are not covered with insulating material it is preferred that a layer of insulating material, as at 38, cover the ends 20 of loops Fig. 1 assembled in core 32 before the remainder of the winding is assembled therein. After the remainder of the winding, consisting of loops Fig. 5, is placed in the core it appears substantially as shown in Fig. 7. The free ends of the loops will extend thru and beyond the core.

The projecting ends of more or less widely separated bars must now be brought together in a manner to complete the winding turns and form a continuous circuit therefrom and to this end adjacent layers, the bars of which interconnect, are bent, the one layer helically right hand and the other layer helically left hand, similar to the bent portions 28, 29, 30 and 31 at the closed ends of the loops, the pairs thus formed being joined together, and the extended ends 26 and 27 being joined to the bars of a commutator.

A most novel and useful feature of this invention resides in the combination of the two forms of loops. It is obvious that when a 6 layer winding of this character is composed of three loops all of the form shown in Fig. 4 the winding circuit will progress from a terminal of the outer layer inwardly thru an outer loop, then inwardly thru a middle loop, then inwardly thru an inner loop to a terminal of the inner layer when in order to continue further this terminal of the inner layer must connect again to a terminal of the outer layer which is widely separated therefrom. When, however, loops of two kinds are combined, as shown, the circuit may start at a terminal of the outer layer, progress inwardly thru the large loop Fig. 5 to a terminal of the inner layer, then outwardly thru the inner intermediate loop, then outwardly thru the outer intermediate loop when it will end at a terminal which is adjacent to an outer layer terminal to which it may be readily joined to continue the circuit.

Figure 9:
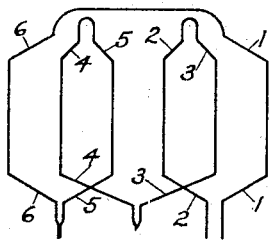
Fig. 9 shows diagrammatically one form that the winding elements may take after being bent and joined.
Figure 10:
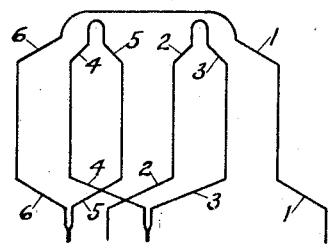
Fig. 10 shows diagrammatically another form that the winding elements may take after being bent and joined.
Figure 11:
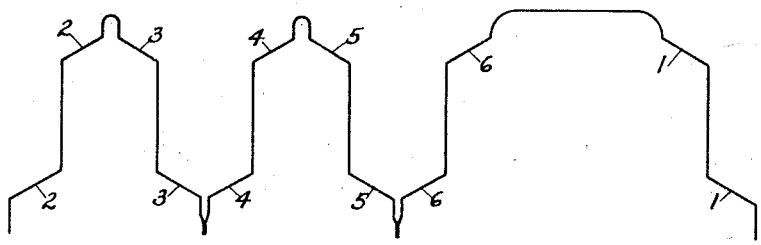
Fig. 11 shows diagrammatically another form that the winding elements may take after being bent and joined.

A winding as disclosed is equally adaptable to lap or wave connection and to more clearly show the relative direction that the helically disposed ends of the winding may take to produce these forms, I show diagrammatically in Fig. 9 a lap connected unit and in Figs. 10 and 11, wave connected units. In all three figures the numeral 1 indicates the first or outer layer of the winding, the numeral 2 the next and so on to numeral 6 which indicates the inner layer, and from the diagram may readily be seen the relative direction that the helically disposed portions or leads of the loops take. In Fig. 9 it will be noticed that the leads at the closed ends of the loops alternate, layer 1 to the left, 2 to the right, 3 left, 4 right, 5 left and 6 right, while at the open ends of the loops the leads alternate from layer to layer, but are in each layer opposite to the leads at the closed ends.

In Fig. 10 it should be noticed that at the closed ends of the coils the leads are precisely as in Fig. 9 while at the open ends the leads extend 1 left, 2 right, 3 right, 4 left, 5 right and 6 left.

Fig. 11 shows a wave connection in which each turn of the winding progresses in waves of the same direction around the core and its effect is identical with that of Fig. 10 tho not commonly used. In this the leads extend at both closed and open ends precisely as they do in the closed end of Fig. 9.

While I have herein shown and described several forms of windings to which my improved method applies, it is not intended that the specific forms and methods be rigidly carried out, but that any change may be made that does not depart from the spirit of the invention, or is not limited by prior art.

I aim to define the scope of the invention in the following, wherein I claim—

1. A dynamo electric machine element comprising a core having winding apertures and a plurality of conductor bars arranged in said apertures in several concentric layers with the ends of the bars extending from the said apertures at both ends of the core, bent so as to join angularly spaced apart bars together in pairs, said pairs at one end of the core all being composed of bars of adjacent layers and said pairs at the other end of the core being partly composed of bars of the outer layer coming together with bars of the inner layer and the remainder of bars of adjacent layers.

2. A plural turn bar winding comprising a plurality of conductor bars arranged in several concentric layers with bent ends of bars of one layer and oppositely bent ends of angularly spaced apart bars of an adjacent layer brought together in pairs, except at one end of the winding where bent ends of bars of the outer layer are brought together with oppositely bent ends of bars of the inner layer.

3. A dynamo electric machine element having a plural turn bar winding in several concentric layers with the end turns at one end of the core joining bars of the outer layer to angularly spaced apart bars of the inner layer, and with the end turns at the other end of the core joining bars of the outer layer to angularly spaced apart bars of the layer next to the outer layer and bars of the inner layer to angularly spaced apart bars of the layer next to the inner layer, all other end turns joining angularly spaced apart bars of adjacent layers.

4. A plural turn bar winding comprising a plurality of conductor bars arranged in several concentric layers with integral end turns at one end of the winding, a portion of which join the outer layer bars to angularly spaced apart inner layer bars, the remainder joining bars of one layer to angularly spaced apart bars of the adjacent layers, and at the other end of the winding end turns all composed of brought together ends of angularly spaced apart bars of adjacent layers.

5. In a dynamo electric machine element a core with closed winding apertures and a winding in several concentric layers comprising a plurality of bar conductors in said apertures each bent in the form of a loop, a portion of the loops being formed so that one leg of the loop comes in the outer layer and the other leg in an angularly spaced apart position in the inner layer, the remaining loops being formed so that one leg comes in an intermediate layer and the other leg in a layer adjacent the said intermediate layer, and the free ends of the loops at the other end of the core being brought together in pairs, an outer layer leg to an angularly spaced apart leg of the layer next the outer layer, an inner layer leg to an angularly spaced apart leg of the layer next to the inner layer, and all other turns being completed by bringing together angularly spaced apart legs of adjacent intermediate layers.

6. A structure such as is described in claim 5 with a commutator having each segment joined to two only of the brought together legs of two adjacent layers.

In testimony whereof I hereunto set my hand.

VINCENT G. APPLE.